United States Patent [19]

French et al.

[11] 4,456,713

[45] Jun. 26, 1984

[54] COMPOSITION FOR INJECTION MOLDING

[75] Inventors: Kenneth W. French, Merrimack, N.H.; Jeffrey T. Neil, E. Pepperell; Larry L. Turnbaugh, West Roxbury, both of Mass.

[73] Assignee: GTE Laboratories Incorporated, Waltham, Mass.

[21] Appl. No.: 450,960

[22] Filed: Dec. 20, 1982

[51] Int. Cl.³ .............................. C08K 5/09; C08K 5/01
[52] U.S. Cl. .................................... 523/455; 523/457; 523/465; 524/322; 524/443; 524/487; 524/488; 524/430; 524/442
[58] Field of Search ............... 523/457, 465, 455; 524/430, 442, 487, 322, 443, 488

[56] References Cited

U.S. PATENT DOCUMENTS

| | | | |
|---|---|---|---|
| 1,847,102 | 3/1932 | Scott | 264/63 |
| 2,593,507 | 4/1952 | Wainer | 264/44 |
| 2,929,126 | 3/1960 | Bollack et al. | 264/63 |
| 2,939,199 | 6/1960 | Strivens | 264/63 |
| 3,234,308 | 2/1966 | Harrmann | 264/63 |
| 3,285,873 | 11/1966 | Bailey | 524/141 |
| 3,882,210 | 5/1975 | Crossley et al. | 264/63 |
| 3,953,562 | 4/1976 | Hait et al. | 264/63 |
| 4,000,220 | 12/1976 | Saito et al. | 525/253 |
| 4,144,207 | 3/1979 | Ohnsorg | 523/209 |
| 4,158,688 | 6/1979 | Pett et al. | 264/63 |
| 4,158,689 | 6/1979 | Pett et al. | 264/63 |
| 4,207,226 | 6/1980 | Storm | 524/127 |
| 4,233,077 | 11/1980 | Hazel | 501/88 |
| 4,233,256 | 11/1980 | Ohnsorg | 264/44 |
| 4,267,086 | 5/1981 | Pett et al. | 524/277 |
| 4,283,360 | 8/1981 | Henmi et al. | 264/63 |

OTHER PUBLICATIONS

Lee et al., Handbook of Epoxy Resins; McGraw-Hill Book Co.; 1967; pp. 12-12.

*Primary Examiner*—Lewis T. Jacobs
*Attorney, Agent, or Firm*—Ivan L. Ericson

[57] ABSTRACT

A composition for injection molding a sinterable material such as silicon nitride.

This composition includes a binder system which imparts a greater flexibility to the, as molded, green body. The binder-system contains a major component of paraffin wax, a minor component of epoxy resin, and a surfactant.

12 Claims, No Drawings

COMPOSITION FOR INJECTION MOLDING

FIELD OF THE INVENTION

This invention relates to compositions for injection molding. More particularly, it is concerned with organic binder compositions in combination with a sinterable material suitable for injection molding.

BACKGROUND OF THE INVENTION

Sinterable materials may be formed into shapes by various processes. Injection molding is a process wherein a material can be formed into a shape by forcing the material into a mold or die by fluidizing the material and injecting the fluidized material into the mold by applying a pressure to the fluidized material. The injection molding process facilitates a rapid and repeated forming of a plurality of articles having a consistent shape with close dimensional tolerances. The injection molding process minimizes the amount of shaping or machining that may be required to produce a finished article.

Many problems are encountered in the injection molding process for particulate materials which require high solids to binder ratio. Some of the problems which make it very difficult to make complex shapes of high solids to binder ratio compositions required in many sinterable materials (e.g. silicon nitride) are low green strength of the articles as molded, segregation of the binder from the particulate material during molding and poor green body flexibility.

OBJECTS OF THE INVENTION

Accordingly, it is an object of the present invention to provide an improved composition which includes sinterable material for injection molding.

It is another object of this invention to provide an improved organic binder composition for injection molding a sinterable material whereby the injection molded sinterable material containing the improved organic binder composition will have an improved, as molded, green body flexibility.

SUMMARY OF THE INVENTION

The composition in accordance with the present invention comprises at least 55 percent by volume of a finely divided sinterable material, and an organic binder composition. The organic binder composition comprises from about 80 to about 90 percent by weight of a hydrocarbon wax having a melting point from about 40° C. to about 75° C. and a volatilization temperature from about 150° C. to about 450° C., from about 5 to about 15 percent by weight of a thermosetting resin having a thermosetting temperature from about 120° C. to about 160° C., and a surfactant.

DETAILED DESCRIPTION OF THE PREFERRED EMBODIMENTS

For a better understanding of the present invention, together with other and further objects, advantages and capabilities thereof, reference is made to the following disclosure and appended claims.

A composition suited to be injection molded comprises at least 55 percent by volume of a finely divided sinterable material and an organic binder. The finely divided sinterable material is a ceramic such as silicon nitride and/or aluminum oxide containing sintering aids. Preferably silicon nitride containing sintering aids such as yttria and alumina is used as the finely divided sinterable material.

The organic binder comprises a hydrocarbon wax (i.e., paraffin wax such as Astor Chemical Co. Grade 1865Q; Fisher Chemical Co. Grade P-21, P-21; Roger Reed Co. wax having melting points from 125° F. to 165° F.; Shell Oil Co. Shell wax 120; and Amoco Oil Co. Parowax) from about 80 to about 90 percent by weight, preferably from about 85 to about 90 percent by weight; a liquid thermosetting resin (i.e., epoxy resin containing a hardener) from about 5 to about 15 percent by weight, preferably from about 5 to about 10 percent by weight; and a surfactant (i.e., oleic acid, stearic acid) from about 3.6 to about 5 percent by weight, preferably about 5 percent by weight. Preferably a bisphenol-A epichlorohydrin resin containing hexahydrophthalic anhydride is the particular epoxy resin and hardener used.

In a specific example of the present invention, the sinterable material is a high purity finely divided silicon nitride powder commercially available from GTE Products Corporation and designated as SN502. The silicon nitride is ballmilled with sintering aid powders of 6 w/o yttria and 2 w/o alumina.

The ball milled mixture of silicon nitride containing the sintering aids is preheated to remove adsorbed water. 1900 grams of the prepared silicon nitride and 321 grams of a binder composition consisting of 90 w/o paraffin wax (Astor Chemical 1865 Q), 5 w/o of surfactant (Fisher Oleic Acid A-215), and 5 w/o of epoxy thermosetting material (Acme 5144) are compounded in a Bramley two bladed dispersion mixer, model BEKEN. The mixing chamber is heated to 80° C. Mixing is continued until the material has a creamy, homogenous appearance. About 2 hours of mixing time subsequent to the initial blending of the particulate and binder materials is sufficient. At this point a vacuum is applied and the mixing continued approximately 45 minutes to remove any entrapped air. The resulting mixture has rheological properties comparable to a thermoplastic material with a softening range of 40° to 75° C. It can be pelletized or granulated according to well known techniques to a uniform particle size suitable as a feed material for injection molding apparatus.

The molding is accomplished by known injection molding techniques. Injection molding is usually carried out utilizing the transfer method or the direct injection method. In the transfer method a hydraulic press forces the material from a heated storage chamber, by means of a plunger, through sprues or runners, into a mold. In the direct injection method, the heated mixture is forced directly into the mold, through runners and gates, by either a hydraulic plunger or by reciprocating screw equipment. Either method may be utilized.

For the examples described in Table I the material was molded into bar shapes utilizing a 10 ton Hull transfer press. Granulated material was loaded into the storage chamber and preheated to the molding temperature. Optimum molding temperature is usually just above the melting point of the binder composition. For the specific examples 3, 4 and 5 (Table I), which are examples of the invention in which paraffin wax is the major binder component and epoxy is a minor component, the chamber temperature was 70°–72° C. The die, containing two bar shaped cavities approximately $\frac{1}{8}"\times\frac{1}{4}"\times2\frac{1}{2}"$, was maintained at room temperature (24° C.). Molding pressure must be sufficient to force the preheated mixture into all areas of the die. A pressure of 1500 psi is adequate for these materials, die and molding conditions. The shot was injected into the die cavity and the pressure held for ½ minute. The pressure was released, the die opened, and the parts removed from the die.

The green, as molded, test bars (⅛"×¼"×2½") were tested at room temperature in a four-point flexure apparatus having an outer and inner knife edge spans of 4.06 cm and 1.78 cm.

The results of a test series having various binder compositions are shown in Table I.

TABLE I

MOR TESTS OF AS MOLDED GREEN BARS

| Test | Binder Composition, w/o | Deflection |
|---|---|---|
| 1. | 70% Paraffin Wax<br>30% Stearic Acid | 0.004 in |
| 2. | 85% Paraffin Wax<br>10% Microcrystalline Wax<br>5% Stearic Acid | 0.006 in |
| 3. | 90% Paraffin Wax<br>5% Epoxy<br>5% Stearic Acid | 0.026 in |
| 4. | 90% Paraffin Wax<br>5% Epoxy<br>5% Oleic Acid | 0.028 in |
| 5. | 85% Paraffin Wax<br>10% Epoxy<br>5% Oleic Acid | 0.056 in |
| 6. | 79.2% P.E. Waxes*<br>7.2% Paraffin Wax<br>10% Epoxy<br>3.6% Oleic Acid | 0.005 in |
| 7. | 72.0% P.E. Waxes*<br>14.4% Paraffin Wax<br>10% Epoxy<br>3.6% Oleic Acid | 0.006 in |
| 8. | 57.6% P.E. Waxes*<br>28.8% Paraffin Wax<br>10.0% Epoxy<br>3.6% Oleic Acid | 0.007 in |
| 9. | 46.8% P.E. Waxes*<br>39.6% Paraffin Wax<br>10.0% Epoxy<br>3.6% Oleic Acid | 0.005 in |

*P.E. = polyethylene type waxes

The deflection or cross head travel prior to failure is an indication of the flexibility, the ability to bend without breaking or cracking. The deflection can also be called yield to failure.

As shown in Table I tests 1 and 2 are examples in which paraffin wax is the major binder component with no epoxy formulated. The low deflection of 0.004 inches and 0.006 inches respectfully indicate poor flexibility of the green test bars in tests 1 and 2. Tests 3, 4 and 5 are examples in which paraffin wax is the major binder component and the epoxy is a minor component. The higher deflection values of 0.026 inches, 0.028 inches and 0.056 inches respectfully indicate good flexibility of the green test bars in tests 3, 4 and 5. Tests 6, 7, 8 and 9 are examples in which the epoxy and the paraffin wax are the minor components (less than 50%), with other type hydrocarbon wax (Polyethylene) making up the remainder of the binder composition. The low deflection values of 0.005 inches, 0.006 inches, 0.007 inches and 0.005 inches indicate poor flexibility of the green test bars in tests, 6, 7, 8 and 9.

The improved as molded green body flexibility imparted by the binder composition in accordance with the present invention in which paraffin wax is the major binder component and the epoxy is a minor component (as indicated by the results of tests 3, 4 and 5) is an unexpected beneficial change in the properties of the sinterable material—binder system combination.

While there has been shown and described what are at present considered the preferred embodiments of the invention, it will be obvious to those skilled in the art that various changes and modifications may be made therein without departing from the scope of the invention as defined by the appended claims.

What is claimed is:

1. A composition suited to be injection molded comprising
   at least 55 percent by volume of a finely divided sinterable material; and
   an organic binder composition comprising
   from about 80 to about 90 percent by weight of a hydrocarbon wax having a melting point from about 40° C. to about 75° C. and a volatilization temperature from about 150° C. to about 450° C.,
   from about 5 to about 15 percent by weight of a thermosetting resin having a thermosetting temperature from about 120° C. to about 160° C., and
   a surfactant.

2. A composition according to claim 1 wherein said sinterable material is selected from the group consisting of silicon nitride, aluminum oxide, and combinations thereof.

3. A composition according to claim 1 wherein said sinterable material comprises silicon nitride.

4. A composition according to claim 1 wherein said hydrocarbon wax comprises a paraffin wax.

5. A composition according to claim 1 wherein said thermosetting resin comprises an epoxy resin containing a hardener.

6. A composition according to claim 5 wherein said epoxy resin containing a hardener comprises bisphenol-A epichlorohydrin resin containing hexahydrophthalic anhydride.

7. A composition according to claim 1 wherein said surfactant is selected from the group consisting of oleic acid, stearic acid, and combinations thereof.

8. An organic binder composition for injection molding sinterable material comprising
   from about 80 to about 90 percent by weight of a hydrocarbon wax having a melting point from about 40° C. to about 75° C. and a volatilization temperature from about 150° C. to about 450° C.,
   from about 5 to about 15 percent by weight of a thermosetting resin having a thermosetting temperature from about 120° C. to about 160° C., and
   a surfactant.

9. An organic binder composition according to claim 8 wherein said hydrocarbon wax comprises a paraffin wax.

10. An organic binder composition according to claim 8 wherein said thermosetting resin comprises an epoxy resin containing a hardener.

11. An organic binder composition according to claim 10 wherein said epoxy resin containing a hardener comprises bisphenol-A epichlorohydrin resin containing hexahydrophthalic anhydride.

12. An organic binder composition according to claim 8 wherein said surfactant is selected from the group consisting of oleic acid, stearic acid, and combinations thereof.

* * * * *